US010333872B2

(12) United States Patent
Orr et al.

(10) Patent No.: US 10,333,872 B2
(45) Date of Patent: Jun. 25, 2019

(54) LINKING SCREENS AND CONTENT IN A USER INTERFACE

(71) Applicant: Microsoft Technology Licensing, LLC, Redmond, WA (US)

(72) Inventors: Derek Michael Orr, Redmond, WA (US); Joon Shin, Seattle, WA (US); David John Los, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 463 days.

(21) Appl. No.: 14/706,100

(22) Filed: May 7, 2015

(65) Prior Publication Data

US 2016/0330148 A1 Nov. 10, 2016

(51) Int. Cl.
G06F 3/00 (2006.01)
H04L 12/58 (2006.01)
G06F 3/0488 (2013.01)
G06F 3/0481 (2013.01)
G06F 3/0482 (2013.01)
G06F 3/0484 (2013.01)
G06F 3/01 (2006.01)

(52) U.S. Cl.
CPC .......... H04L 51/046 (2013.01); G06F 3/0481 (2013.01); G06F 3/0482 (2013.01); G06F 3/0488 (2013.01); G06F 3/04847 (2013.01); G06F 2203/04803 (2013.01)

(58) Field of Classification Search
CPC .... G06F 3/0481; G06F 3/0488; G06F 3/0482; G06F 3/04847
See application file for complete search history.

(56) References Cited

U.S. PATENT DOCUMENTS

| 7,818,683 | B2 | 10/2010 | Sorin et al. |
| 8,010,910 | B2 | 8/2011 | Wright et al. |
| 8,560,965 | B2 | 10/2013 | Kawashima |
| 8,745,526 | B2 | 6/2014 | Yach et al. |
| 8,799,827 | B2 | 8/2014 | Hinckley et al. |
| 9,930,160 | B2 * | 3/2018 | Shuttleworth .... H04M 1/72519 |
| 2005/0204306 | A1 * | 9/2005 | Kawahara ............. G06F 3/0481 715/782 |
| 2008/0040683 | A1 * | 2/2008 | Walsh ................. G06F 3/04855 715/786 |
| 2008/0209351 | A1 * | 8/2008 | Macadaan ............. G06F 3/0482 715/762 |

(Continued)

FOREIGN PATENT DOCUMENTS

EP 2767896 A1 8/2014

OTHER PUBLICATIONS

"International Preliminary Report on Patentability Issued in PCT Application No. PCT/US2016/030489", dated Feb. 16, 2017, 10 Pages.

(Continued)

Primary Examiner — Nicholas Augustine

(57) ABSTRACT

Technology is disclosed herein that enhances user interfaces. In one implementation, an application renders a user interface that comprises a navigation element. The navigation element visually links at least one screen to one other screen. The application surfaces a control in the navigation element with which to load data items, and when a data item loaded in the navigation element is active, presents content associated with the data item in the one screen and presents other content associated with the data item in the one other screen.

20 Claims, 17 Drawing Sheets

(56) References Cited

U.S. PATENT DOCUMENTS

| | | | | |
|---|---|---|---|---|
| 2009/0063995 | A1* | 3/2009 | Baron | G06Q 10/10 715/753 |
| 2010/0149565 | A1* | 6/2010 | Mori | B65H 33/00 358/1.9 |
| 2010/0293546 | A1 | 11/2010 | Liu et al. | |
| 2012/0284639 | A1 | 11/2012 | Yuniardi et al. | |
| 2013/0187861 | A1 | 7/2013 | Lavallee | |
| 2014/0013243 | A1 | 1/2014 | Flynn et al. | |
| 2014/0173466 | A1 | 6/2014 | Suri et al. | |
| 2014/0181699 | A1 | 6/2014 | Godsey et al. | |
| 2014/0229888 | A1* | 8/2014 | Ko | G06F 3/04886 715/783 |
| 2014/0344675 | A1* | 11/2014 | Chang | G06F 17/211 715/244 |
| 2015/0100914 | A1* | 4/2015 | Guan | G06F 3/0481 715/781 |
| 2016/0253086 | A1* | 9/2016 | Jiang | G06F 3/048 715/790 |

OTHER PUBLICATIONS

"Microsoft Outlook Web Access Light 2007—Part 2", Published on: Sep. 13, 2006, Available at: http://blogs.technet.com/b/exchange/archive/2006/09/13/3394870.aspx.

Sanders, Mathew, "One Week With Android", Published on: Sep. 1, 2014, Available at: http://mathewsanders.com/one-week-with-Andriod/.

"Navigation Drawer", Published on: Nov. 13, 2013, Available at: http://www.google.com/design/spec/patterns/navigation-drawer.html.

"How to Create an iPhone App: The Complete Beginner's Guide—Part 2", Published on: Nov. 17, 2013, Available at: http://www.appdesigngeek.com/how-to-create-an-iphone-app-the-complete-beginners-guide-part-2/.

"Free iOS App", Retrieved on: Feb. 24, 2015, Available at: https://www.wrike.com/help/free-ios-app/.

Henry, Alan, "Flip Through Apps Like a Fiend With These Improved App Switchers for Android", Published on: Mar. 20, 2013, Available at: http://lifehacker.com/5991574/the-best-android-app-switchers-and-how-to-choose-the-right-one-for-you.

Cerejo, Lyndon, "A User-Centered Approach to Web Design for Mobile Devices", Published on: May 2, 2011, Available at: http://www.smashingmagazine.com/2011/05/02/a-user-centered-approach-to-web-design-for-mobile-devices/.

"Second Written Opinion Issued in PCT Application No. PCT/US2016/030489", dated Oct. 31, 2016, 9 Pages.

"International Search Report and Written Opinion Issued in PCT Application No. PCT/US2016/030489", dated Jul. 11, 2016, 12 Pages.

* cited by examiner

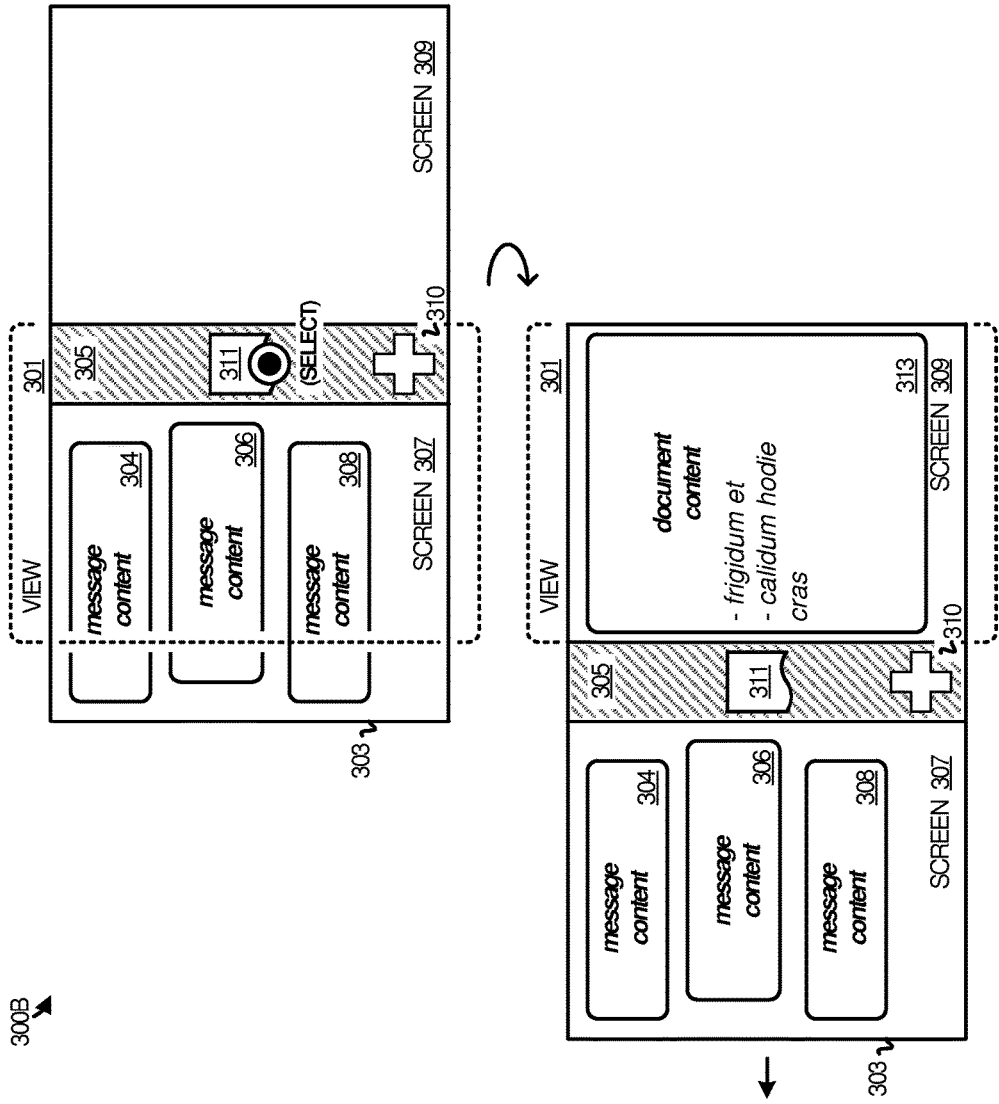

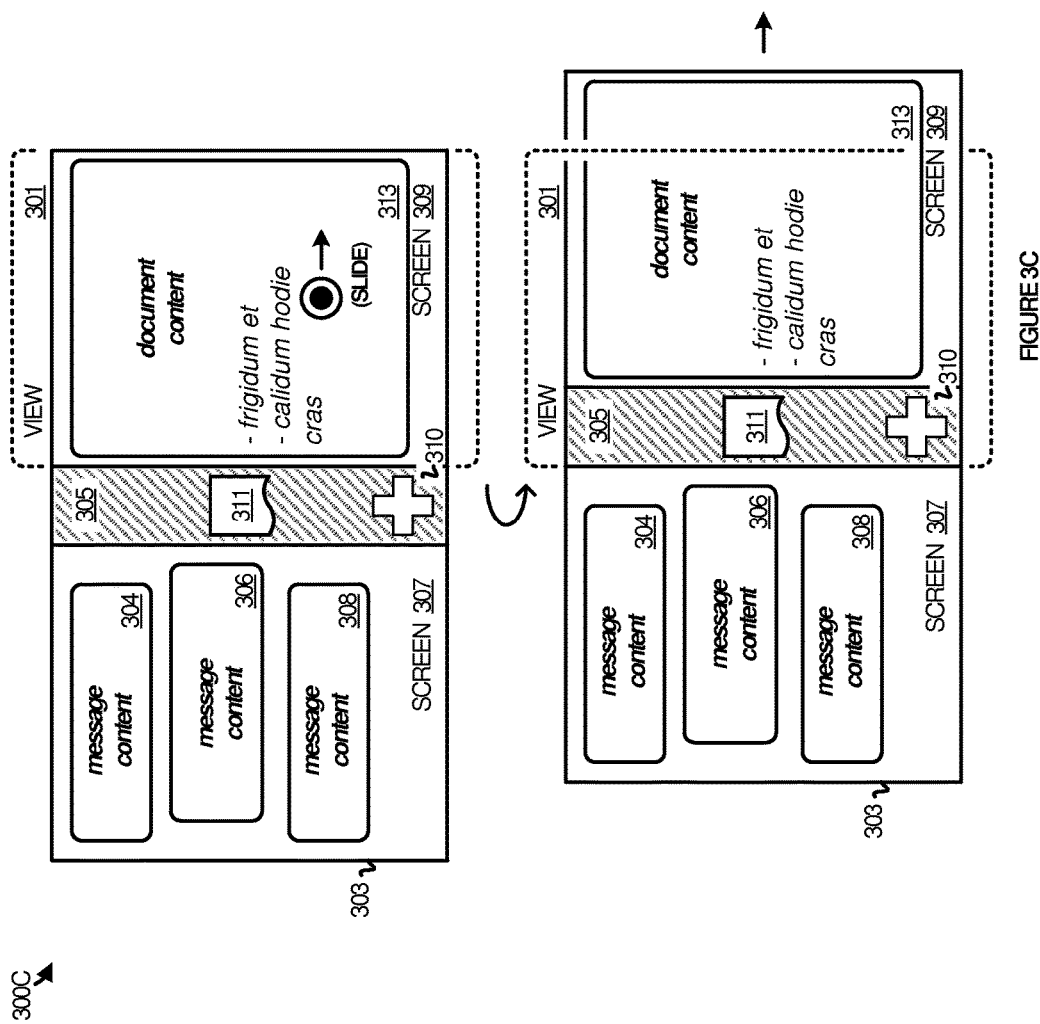

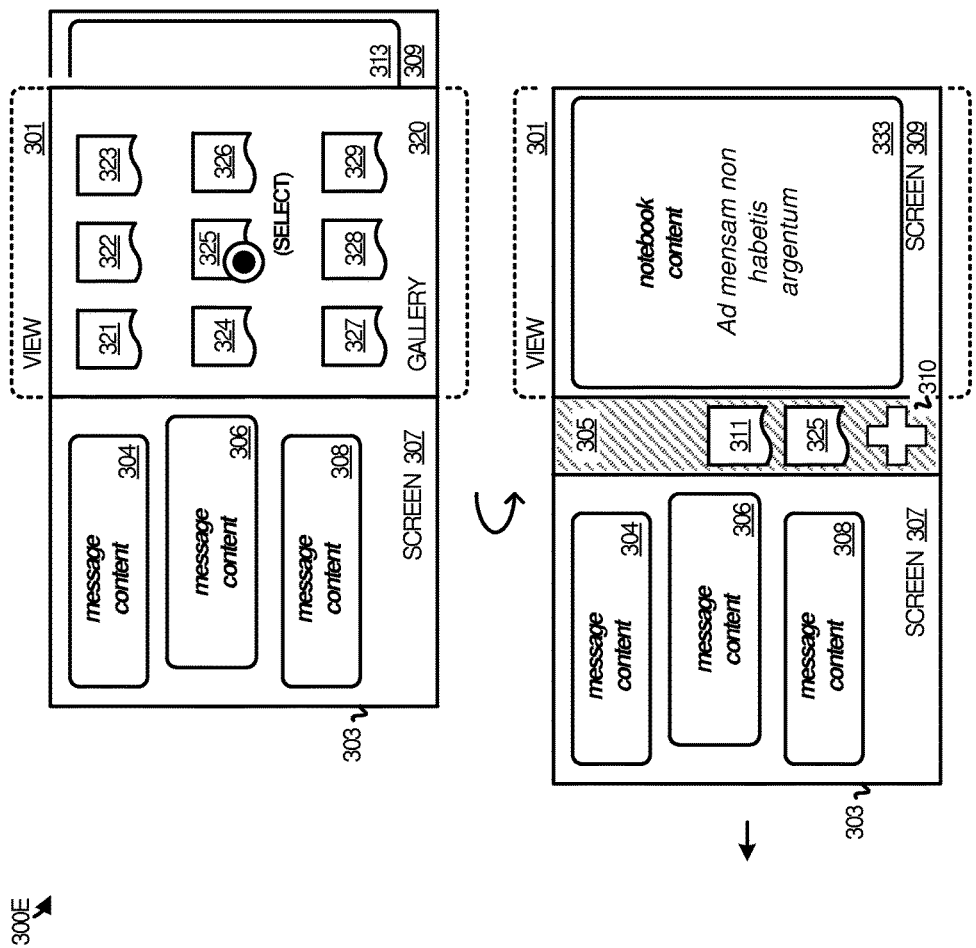

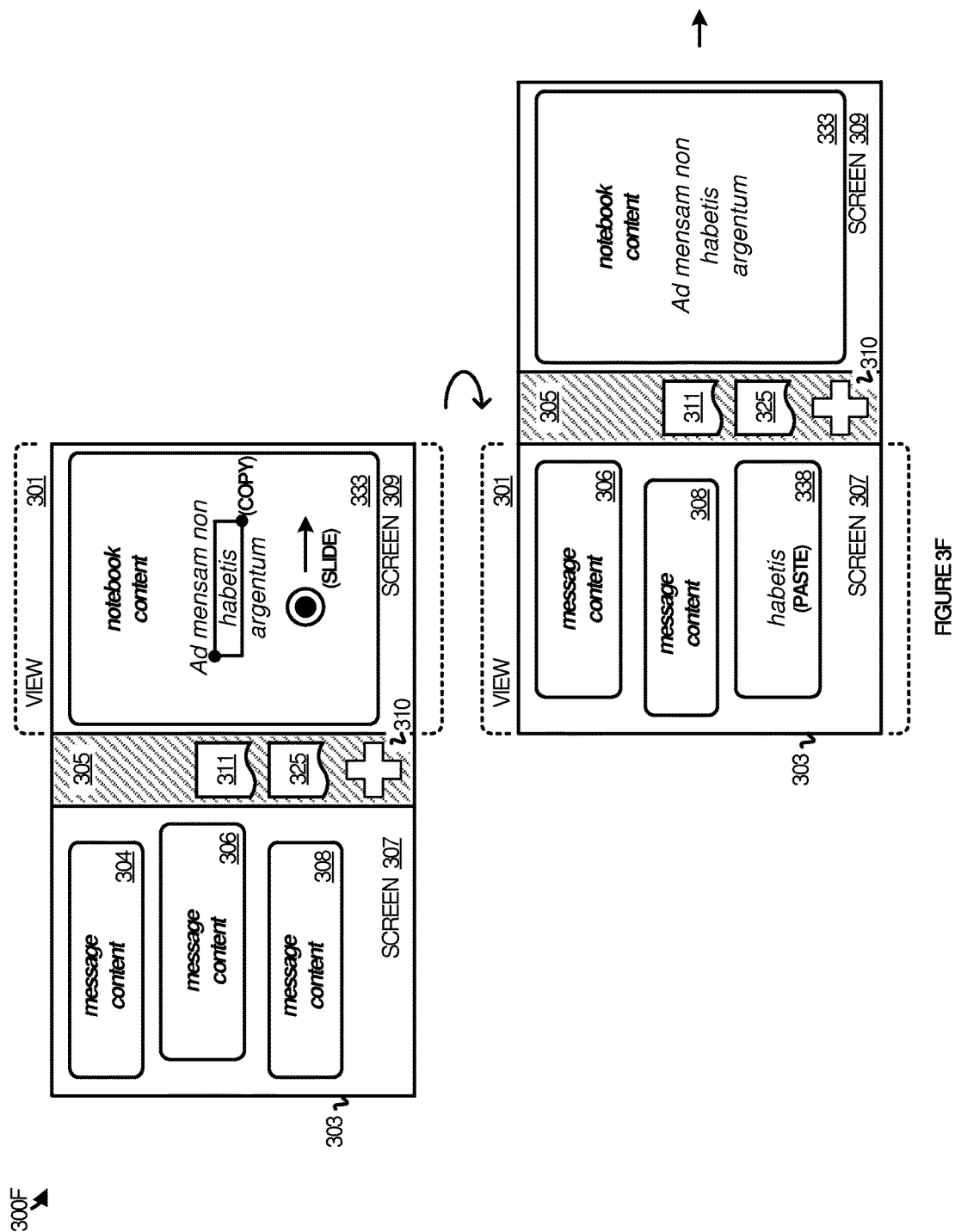

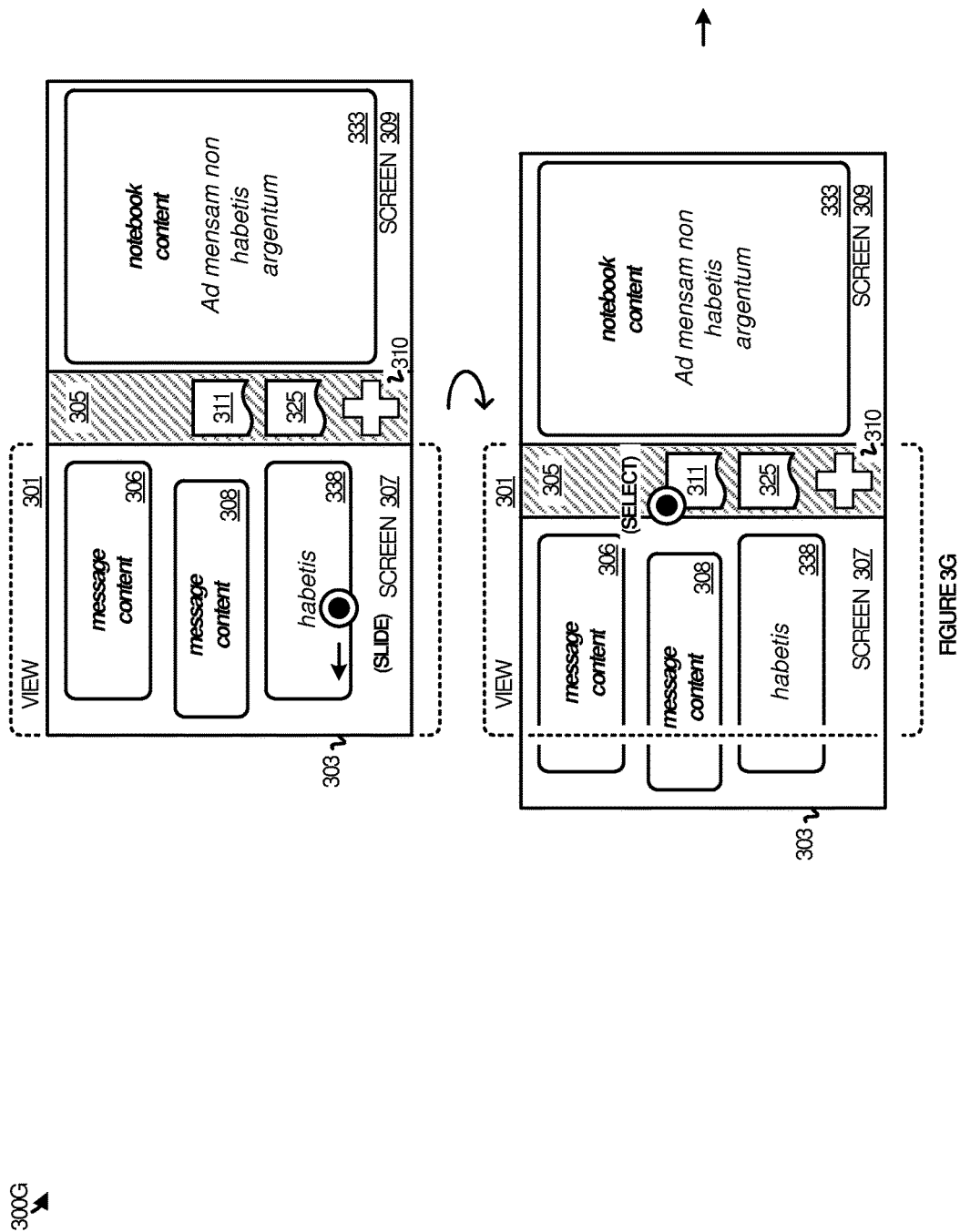

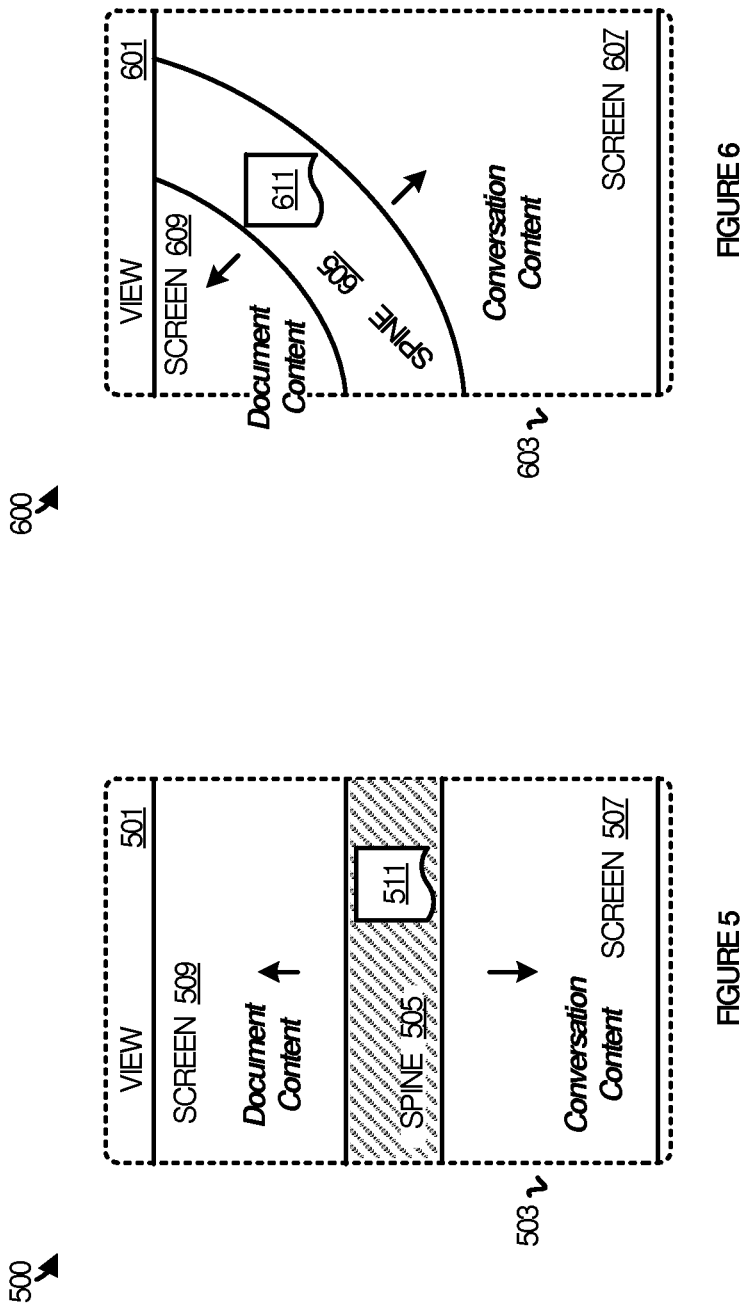

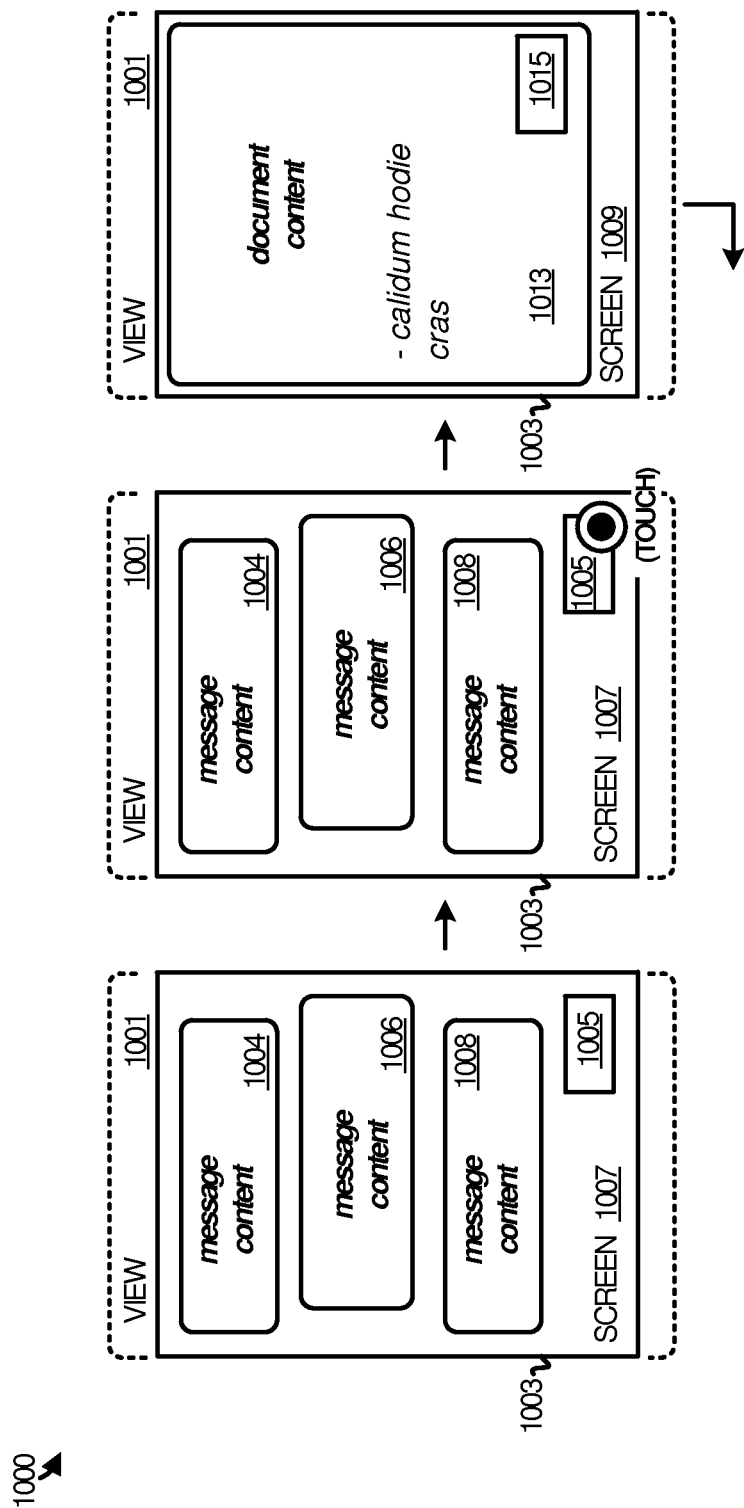

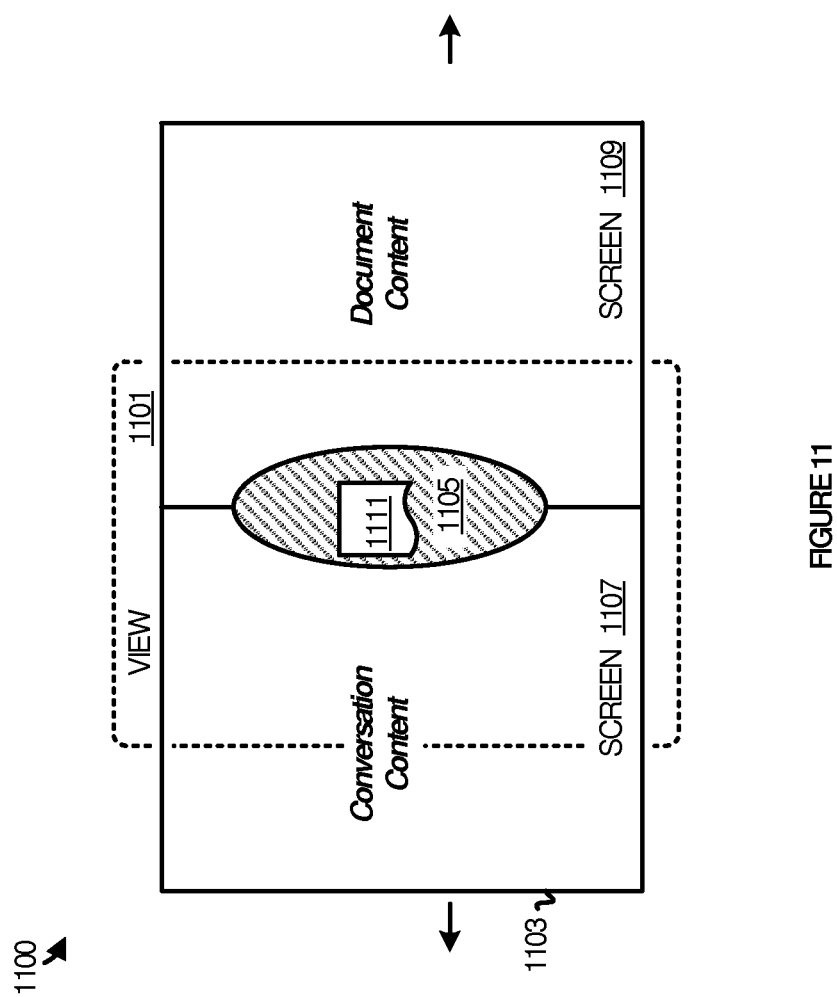

LINKING SCREENS AND CONTENT IN A USER INTERFACE

TECHNICAL BACKGROUND

Software applications developed for smaller form-factor devices, such as smart phones, tablets, and wearable device, sometimes have user interfaces that are difficult to navigate. One particular difficulty is when users lose their place when navigating between screens, or are jarred by a sudden transition from one screen to another.

For example, when engaged in a conversation via a messaging application on a mobile device, a user may navigate to a screen associated with a word processing application in order to edit a document that is the subject of the conversation. After doing so, the user may wish to navigate to a photo application in order to attach a photo to a message that is sent in the context of the conversation. But jumping to the photo application or returning to the messaging app is where the user may encounter difficulty.

When navigating from application to application, a user may move to a home screen to select the next application, which typically involves navigating a roster of applications until the desired one is found. Alternatively, some mobile operating systems are capable of surfacing a representation of which applications are presently open, allowing a user to navigate relatively smoothly from one open application to another without jumping to the home screen.

But in either case, and in more complicated scenarios where a user has navigated into nested screens, getting back to the previous application may be a challenge. It is common for a user to accidentally close one app when moving to another, for instance, or forget where an icon for launching an application is located. Such hindrances are even more troublesome when a user is engaged in a conversation or other interactions that involve multiple applications and capabilities.

Overview

Technology is disclosed herein that enhances the user experience in software applications by linking screens and content in a user interface. In one implementation, an application renders a user interface that includes a navigation element. The navigation element visually links at least one screen to one other screen. The application surfaces a control in the navigation element with which to load data items. The application presents content associated with the data item in the one screen and presents other content associated with the data item in the one other screen.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 3A-3H illustrate various progressions in a user interface with respect to implementations of enhanced screen and content linking.

FIG. 5 illustrates an implementation of screen and content linking.

FIG. 6 illustrates an implementation of screen and content linking.

FIG. 10 illustrates enhanced user interface technology and a user interface progression in an implementation of screen and content linking.

FIG. 11 illustrates enhanced user interface technology in an implementation of screen and content linking.

TECHNICAL DISCLOSURE

User interface technology disclosed herein enhances the user experience with a navigational element that visually links at least one screen to another screen. In some implementations, the navigational element may be representative a spine or other such element positioned between two screens such that a user may remain anchored when navigating between applications or application modalities.

A control may be surfaced in the navigation element with which to load data items. When a data item that has been loaded in the navigation element is active, content associated with the data item may be presented in the one screen and other content associated with the data item may be presented in the one other screen.

In an example, a user may load a word processing document in the navigation element. To one side, bound to the navigation element, the user may engage in a messaging session, while to the other side, the user may be able to view the document. Rather than having to navigate between the messaging function and the document by way of a home screen or some other paradigm, the navigational element binds the two screens together in one cohesive experience.

Figure 1:
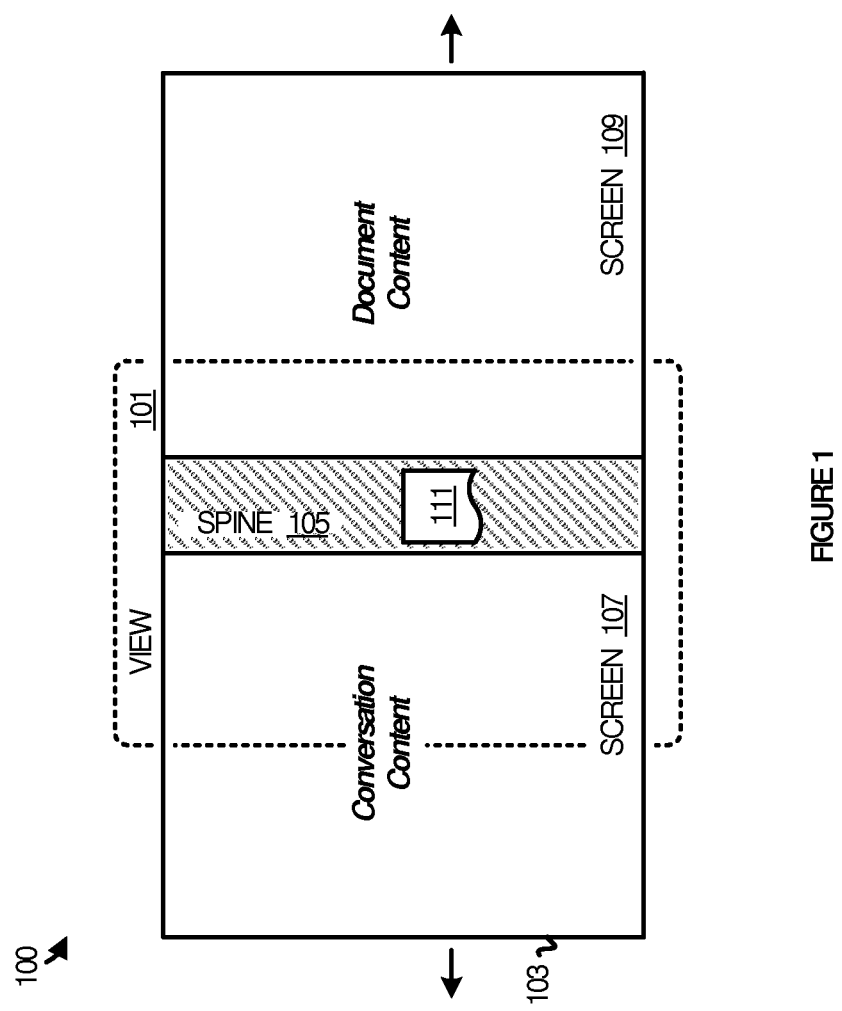
FIG. 1 illustrates enhanced user interface technology in an implementation of screen and content linking.
Figure 9:
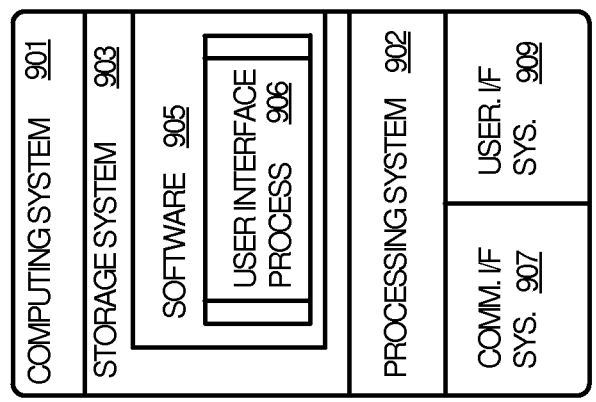
FIG. 9 illustrates a computing system suitable for implementing any of the user interface technology disclosed herein, including the applications, environments, processes, and operational scenarios illustrated in FIGS. 1-8, FIGS. 10-11, and discussed below in the Technical Disclosure.

FIG. 1 illustrates such user interface technology in an implementation 100. Implementation 100 involves view 101 of user interface 103. View 101 is representative of a view provided by a display on a computing device, of which computing device 900 in FIG. 9 is representative. User interface 103 is representative of a user interface that may be rendered on such a display, only a portion of which is visible in view 101 at any given time. User interface 103 may be a user interface to a stand-alone application, an operating system, or any other component or collection of components on a computing device.

User interface 103 includes spine 105, which is representative of a navigational element that binds together two screens in a user interface. Spine 105 binds or visually links screen 107 and screen 109. In this example, spine 105 is oriented vertically and includes two sides, each of which are adjacent in their entirety to one of the screens. Spine 105 be oriented horizontally, diagonally, in or in an arc, or could have some other orientation.

Data item 111 (or a graphical representation thereof) is displayed in spine 105 and is representative of a data item that may be loaded through spine 105. When a data item in spine 105 is active, its content may be rendered in one screen while other content associated with it may be rendered in another screen. In this scenario, data item 111 is a document and document content is rendered in screen 109. Screen 107 is representative of a messaging experience in which conversation content may be rendered.

In implementation 100, user interface 103 is illustrated in a transition position. That is, user interface 103 may be shifted left or right by user input, such as a touch gesture, a drag gesture, a mouse click, a mouse drag operation, a voice command, or some other user input. User interface 103 slides under view 101, in a sense, such that some portion of it is visible in view 101 at any given time.

In one position, all of screen 107 may be visible, while in another, all of screen 109 may be visible. In both cases, the other screen is out of view, as is spine 105. However, in two other position, spine 105 is visible, while only a portion of one of the screens is visible. A user may navigate from one screen to another, or from one screen to spine 105, by swiping left or right a certain amount or to a particular degree.

User interface 103 may be rendered by an application executing on a suitable computing device and may provide a user interface to that application. The application may be a natively installed and executed application, a browser-based application that executes in the context of a web-browser, a streaming application, or some other combination or variation thereof. Alternatively, user interface 103 may also be rendered by an operating system and may be a user interface to the operating system.

In either case, the application or operating system component that renders user interface 103 employs a user interface process to drive various state transitions or progressions in user interface 103. User interface process 200, illustrated in FIG. 2, is representative of one such process that may be employed.

Figure 2:
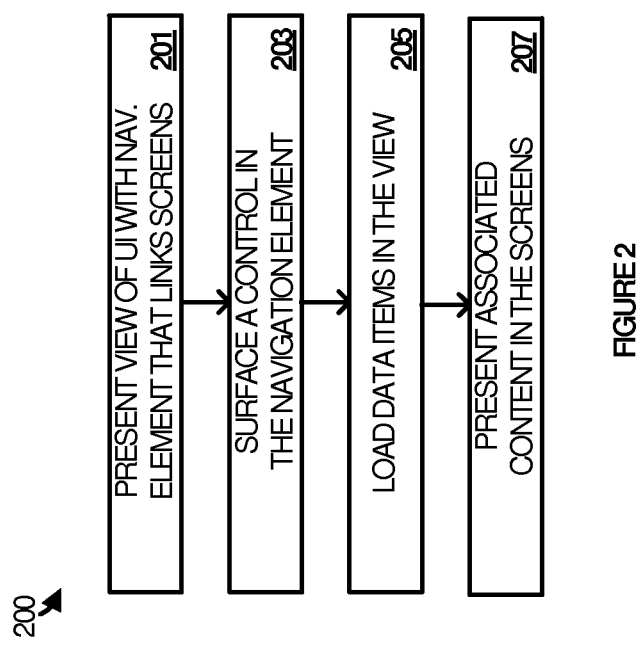
FIG. 2 illustrates a user interface process in an implementation.

Referring parenthetically to the steps illustrated in FIG. 2, an application presents a view of a user interface that includes a navigation element (step 201). A control may be surface in the navigation element by the application through which a user may load a data item (step 203). The user may load the data item (step 205) by, for example, touching, clicking on, or otherwise selecting the control and then selecting a particular item. When the item is active, its content and associated content is presented in at least two screens that are bound together by the navigation element (step 207).

FIGS. 3A-3H each represent a particular progression that could occur in a user interface to an application or an operating system the employs content and screen linking as contemplated herein. In particular, FIGS. 3A-3H illustrate a view 301 of user interface 303. At the direction of a user, a portion of user interface 303 is visible in view 303 at any given time. User interface 303 includes a spine 305, a screen 307, and another screen 309. Spine 305 includes a control 310 for adding data items, of which data item 311 is representative.

Figure 3A:
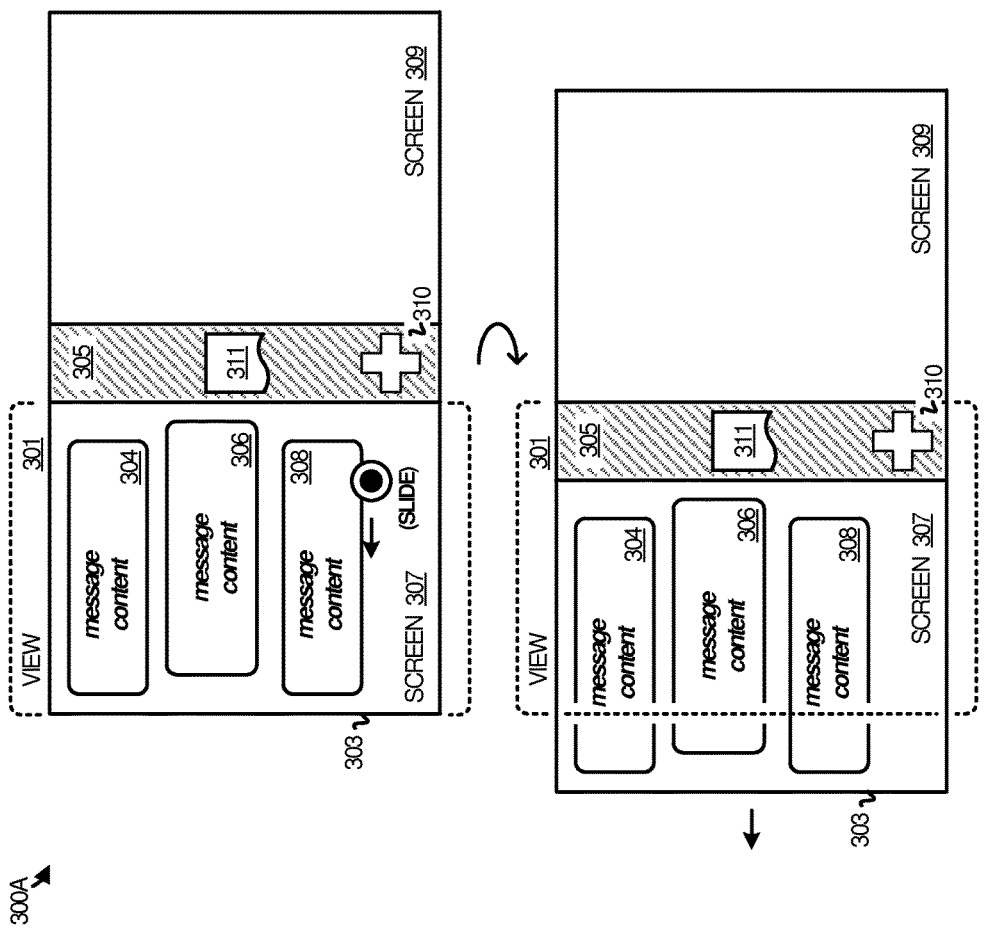

In a first progression 300A, illustrated in FIG. 3A, user interface 303 is initially positioned in view 301 such that screen 307 is visible in its entirety. Spine 305 is positioned out of view, as is screen 309. Screen 307 in this example represents a screen that may be put forth by a messaging application or modality and includes messages 304, 306, and 308.

A user interacting with user interface 303 by way of a touch gesture or some other user input may proceed to slide user interface 303 to the left. This may be accomplished by, for example, touching user interface 330 (or a corresponding location on a display screen) and dragging user interface 330 to the left. This gives the effect of user interface 330 sliding to unveil spine 305.

User interface 303 progresses to a state in which only a portion of screen 307 is visible in view 301. Spine 305 is also visible in this state, which may allow a user to add a data item using control 310 or to launch data item 311. It may be appreciated that data item 311 is yet to be opened and screen 309 is blank accordingly.

FIG. 3B illustrates progression 300B, which is representative of a state transition that could branch from progression 300A, although it may stem from other progressions. Here, user interface 303 is in a position in which spine 305 is visible in view 301 and a portion of screen 307 is visible. A user may select data item 311, causing view 301 to shift to screen 309 as data item 311 is opened. Document content 313 associated with data item 311 is displayed in screen 309 for consumption by the user.

FIG. 3C illustrates progression 300B, which is representative of a state transition that could follow progression 300B. In this progression, document content 313 is opened in screen 309. The user slides user interface 303 to the right to reveal spine 305 in view 301. The slide gestures may stop automatically, or may be hinged, so that the slide does not inadvertently carry through to screen 307. In some cases, the slide may be replicated by a swipe from the left side of view 101 to bring spine 305 into view 101. From here, the user may load a new document into spine 305, navigate to screen 307, or the like.

Figure 3D:
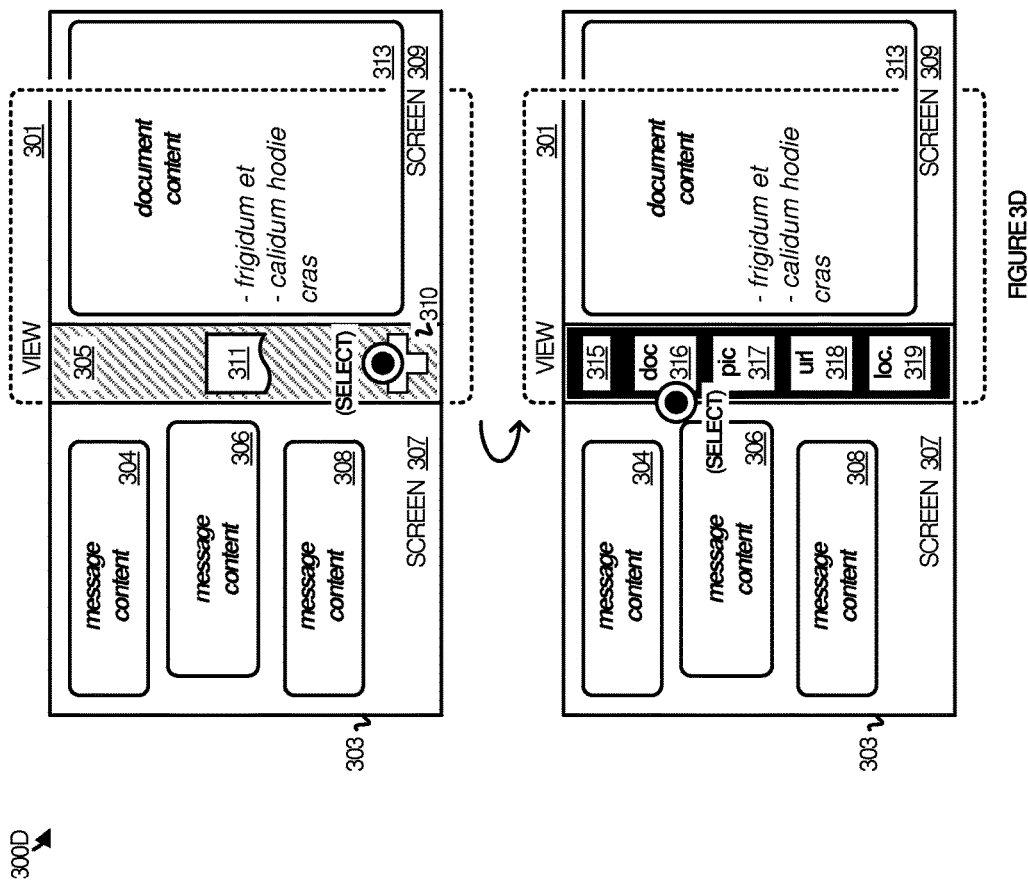
Figure 3H:
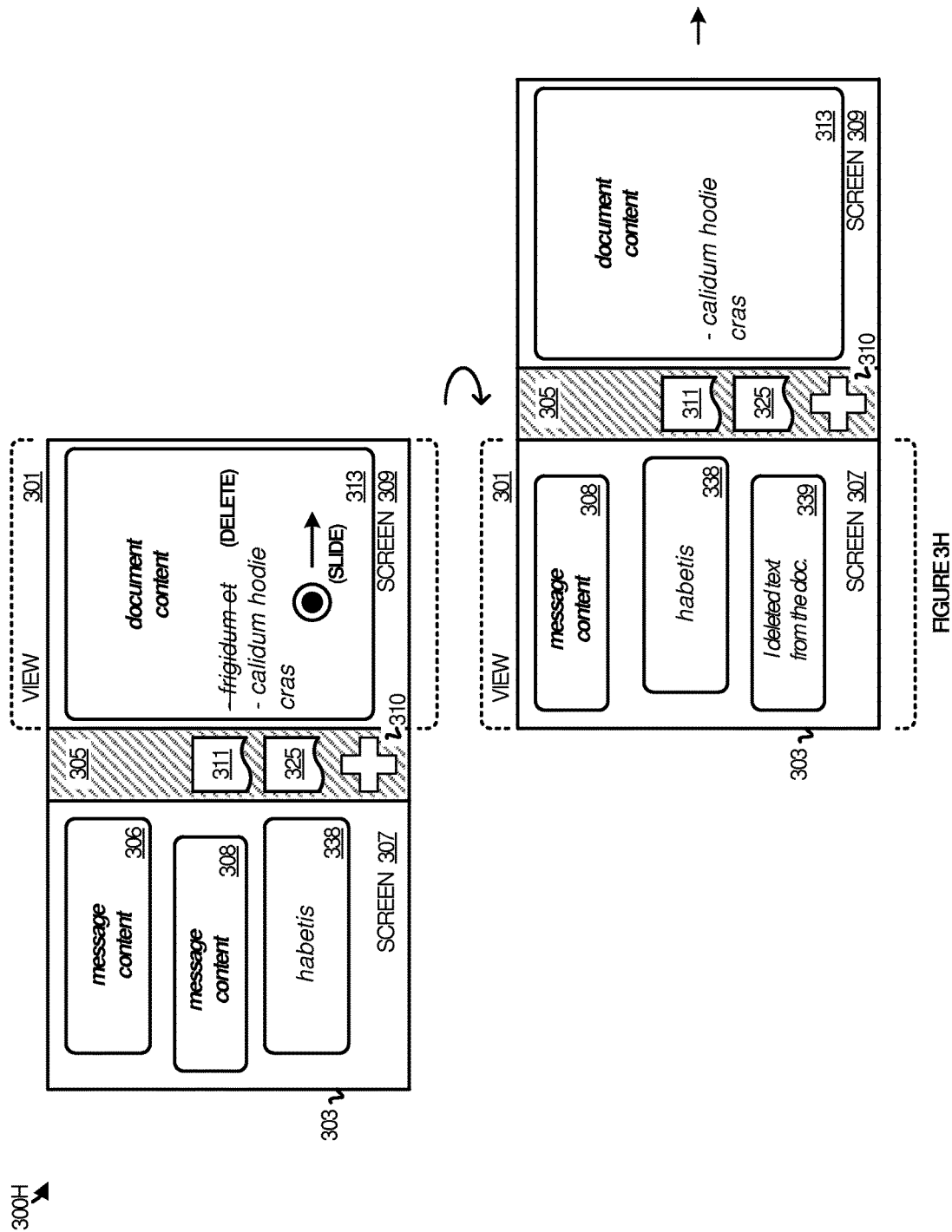

FIG. 3D illustrates progression 300D, which represents a transition in user interface 303 that may follow progression 300C. Here, the user decides to select control 310 in order to add a new data item to spine 305. In response, a menu 315 is surface in place of or overlaid with respect to spine 305. Menu 315 includes various options 316, 317, 318, and 319 for adding new data items to spine 305. Option 316 allows the user to add a document; option 317 allows the user to add a picture; option 318 allows the user to add a web page (URL); and option 319 allows the user to add a location.

It is assumed for exemplary purposes that the user chooses to add a document and selects option 316, which brings user interface to progression 300E illustrated in FIG. 3E. In progression 300E, gallery 320 is surfaced in user interface 303 in response to the selection of option 316. Gallery 320 includes a set of data items from which the user can select one to open in user interface 303. The set of data items are represented by data items 321, 322, 323, 324, 325, 326, 327, 328, and 329. Examples of data items include documents, images, spreadsheets, notebooks, audio files, video, and any other type of data.

Data item 325 is selected in this scenario and it is assumed for exemplary purposes that data item 325 is a notebook. Selecting data item 325 launches a presentation of notebook content 333 in screen 309. In progression 300F, illustrated in FIG. 3F, the user is able to select a portion of the text in notebook content 333 to copy it or manipulate it in some other manner.

After copying the text, the user slides user interface 303 to the right to reveal screen 307 in view 301. The user is then able to paste the copied text into a new message 338 in screen 307. Such a progression demonstrates how a user can easily navigate in user interface 303 from one modality (text editing) to another (messaging). In progression 300G, the user may then wish to open data item 311. The user slides user interface 303 to the left to bring spine 305 into view. From there, the user selects data item 311, which is opened in screen 309. It is assumed for exemplary purposes that data item content 313 is rendered in screen 309 in FIG. 3H, which illustrates progression 300H.

In progression 300H, the user proceeds to edit document content 313. The editing includes deleting some text. The user then slides user interface 303 to the right in order to transition to screen 307, in which she can create another new message 339. The user may, for example, express in the new message 339 that she recently edited a document.

Figure 4A:
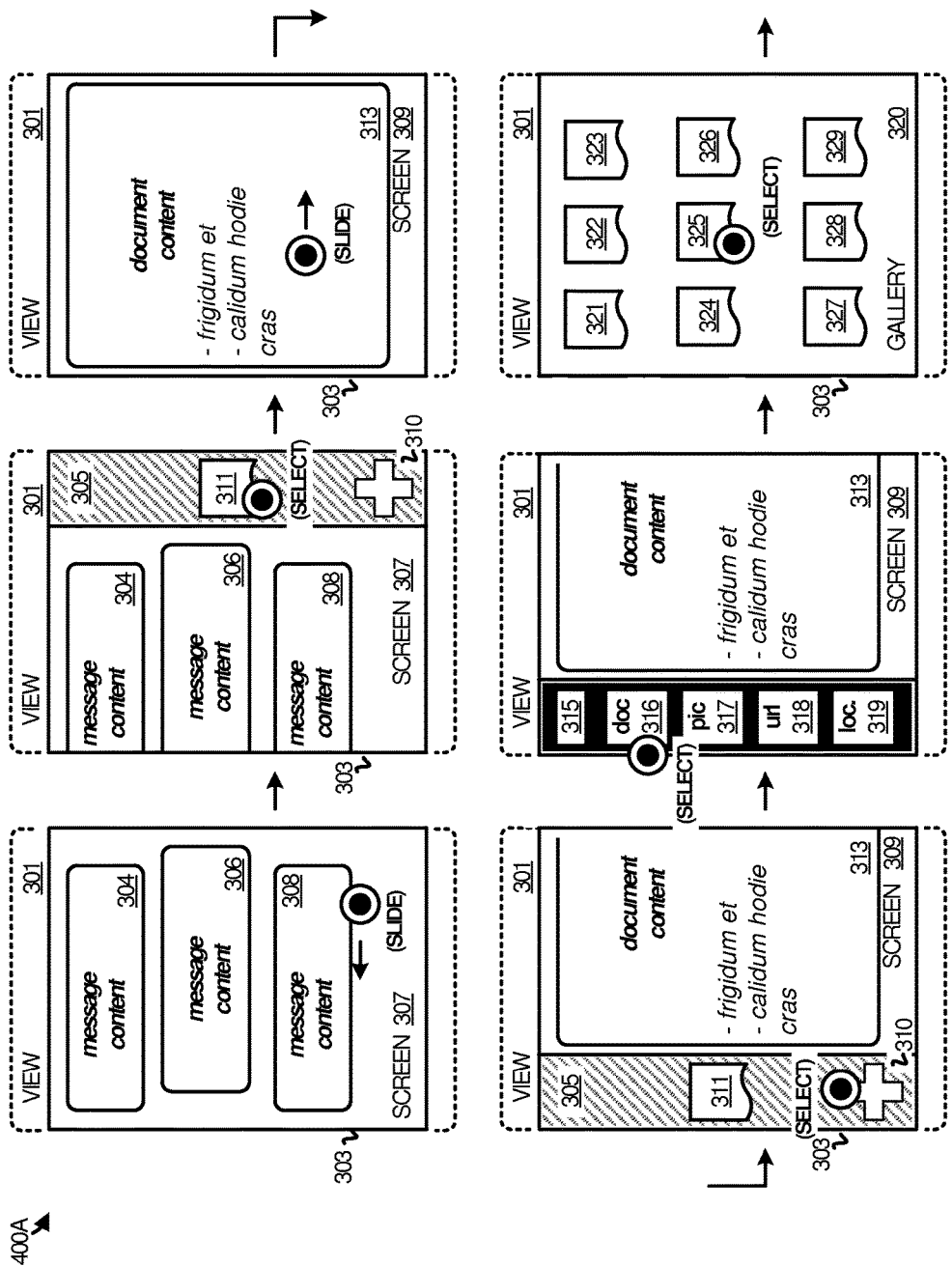
FIGS. 4A-4B illustrate a condensed view of various progressions in a user interface with respect to implementations of enhanced screen and content linking.
Figure 4B:
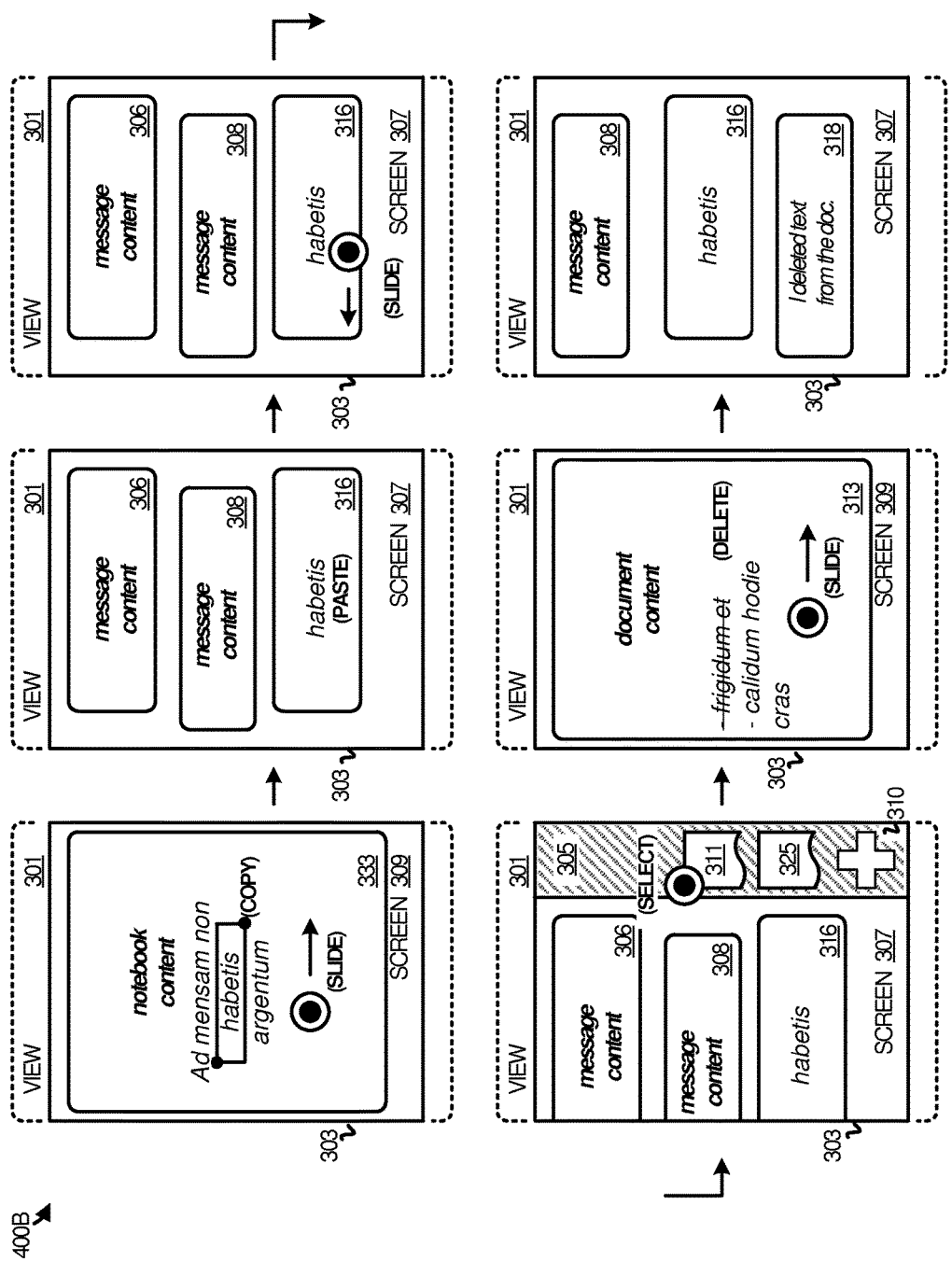

FIG. 4A includes a series 400A of progressions in user interface 303. FIG. 4B also includes a series 400B of progressions that follow from series 400A. The progressions generally relate to those illustrated in FIGS. 3A-3H, but are condensed for better effect. In addition, only the portions of user interface 303 that are visible in view 301 at any given time are shown in FIG. 4A.

In FIG. 4A, screen 307 is initially visible to the user in view 301. The user slides user interface 303 to the left to expose spine 305. From there, the user selects data item 311 in order to view document content 313, which his rendered in screen 309. Screen 309 slides into view as screen 307 is pushed off-screen to the left.

The user may then slide user interface 33 to the right to bring spine 305 back into view. From there, the user selects control 310 in order to load new content. In this case, the user selects option 316 to load a new document. Document 325 is selected, which is assumed to be a notebook.

Referring to FIG. 4B, notebook content 333 is displayed in screen 309, from where the user can select and copy text. The user slides user interface 303 to the right to bring screen 307 into view 101 and pastes the text into a new message 316. From there, the user slides user interface 303 left to bring spine 305 into view. Data item 311 is selected, which brings document content 313 into view 101. The user deletes some content and navigates back over to screen 307 to post a message about the editing event.

FIG. 5 illustrates an implementation 500 of user technology in an alternative where a spine is oriented horizontally instead of vertically Implementation 500 includes view 501 in which user interface 503 is displayed. User interface 503 includes spine 505, oriented horizontally. User interface 503 also includes screen 507 in which content may be displayed and screen 509 in which other content may be displayed. The content displayed in either screen is associated with a data item or items loaded through spine 505, of which data item 511 is representative. A user may navigate user interface 503 in a manner similar to that described for user interface 303 with respect to FIGS. 3A-3H, except that such swipes, slides, and other gestures would be in generally be in a vertical direction, perpendicular to the horizontal orientation of spine 505.

FIG. 6 illustrates an implementation 600 of user technology in another alternative where a spine is curved instead of straight Implementation 600 includes view 601 in which user interface 603 is displayed. User interface 603 includes spine 605, which is generally curved in the upward direction. User interface 603 also includes screen 607 in which content may be displayed and screen 609 in which other content may be displayed. The content displayed in either screen is associated with a data item or items loaded through spine 605, of which data item 611 is representative. A user may navigate user interface 603 in a manner similar to that described for user interface 303 with respect to FIGS. 3A-3H, except that such swipes, slides, and other gestures would be in generally be in a diagonal direction, perpendicular to the diagonal orientation of spine 605.

Figure 8:
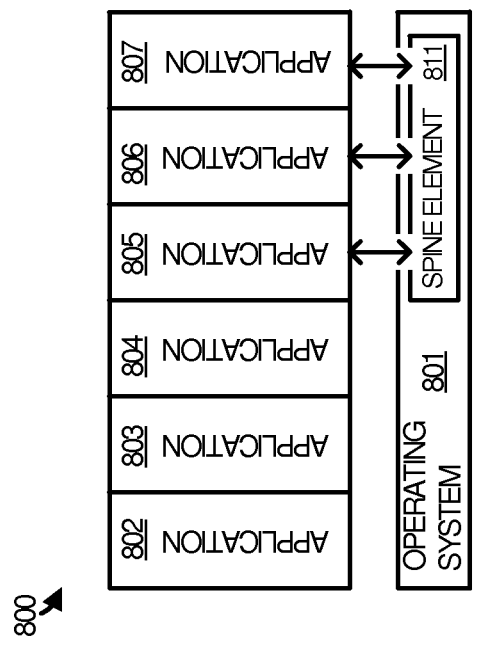
FIG. 8 illustrates another possible software environment for implementing enhanced user interface technology in an implementation of screen and content linking.
Figure 7:
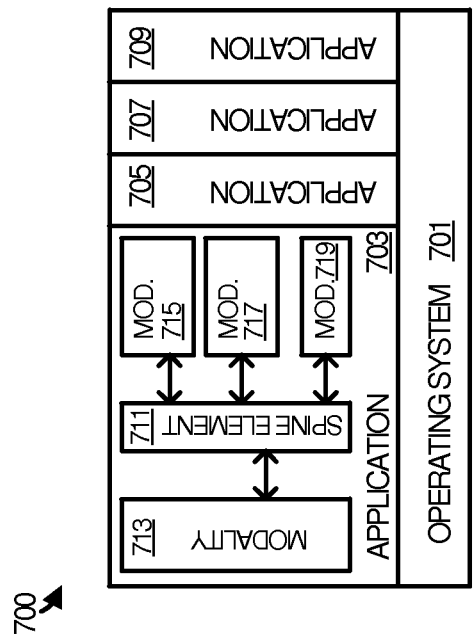
FIG. 7 illustrates a possible software environment for implementing enhanced user interface technology in an implementation, including screen and content linking.

The user interface technology disclosed herein, such as screens, spines, and other aspects of implementation 100, implementation 300, implementation 500, and implementation 600, may be rendered by a suitable computing device executing software instructions, of which computing system 900 illustrated in FIG. 9 is representative. FIG. 7 and FIG. 8 illustrate two possible software environments in which such software technology may be employed.

Software environment 700 in FIG. 7 is illustrative of one environment that includes an operating system 701 and various applications 703, 705, 707, and 709. At least one of the applications, represented by application 703, may be capable of providing the enhanced user interface technology disclosed herein. In this example, application 703 includes various modalities, represented by modality 713, modality 715, modality 717, and modality 719. The modalities may be visually linked together by spine element 711. Thus, a user may navigate between the modalities via spine element 711.

Each modality may be a sub-application or may be capable of providing distinct features or functions that distinguish it from other modalities. For example, many personal information management applications include an email modality, a calendar modality, a contacts modality, and a tasks modality. The modalities in the calendar application could be linked by a spine as disclosed herein. In another example, an application may include an instant messaging modality, a document editing modality, a notebook modality, an image viewer modality, or the like. Any type of modality, variation, or combination thereof is possible and may be considered within the scope of the disclosure.

FIG. 8 illustrates software environment 800, which illustrates a different way in which the enhanced user interface technology that is disclosed herein may be deployed. Software environment 800 includes operating system 801 and various applications 802, 803, 804, 805, 806, 807, 808, and 809. Operating system 801 also includes spine element 811. Spine element 811 may visually link together screens produced by any one or more of the applications supported by operating system 801. In other words, spine element 811 (and the spines disclosed in FIGS. 1-6) may visually link content and screens produced by different applications. Spine element 811, or a graphical representation thereof, may be presented in a user interface to operating system 801 to allow a user to navigate between applications.

Jumping ahead to FIG. 10, a user interface progression 1000 is illustrates that involves an implementation of content and screen linking technology. In FIG. 10, view 1001 at first includes screen 1007 in user interface 1003. User interface 1003 may be a user interface to an instant messaging application or modality, for example, and includes various messages 1004, 1006, and 1008. Screen 1007 also includes an icon 1005 or other such control. Selecting icon 1005 causes the application that produced screen 1007 to jump to a linked screen produced by another application or modality.

In this implementation, the other linked screen is represented by screen 1009. Screen 1009 in user interface 1003 includes document content 1013. Icon 1015 is surfaced over document content 113 and provides a mechanism by which a user may navigate back to screen 1007. Other icons may also be present, such as one to surface a menu through which to load new content or navigate to mother modalities.

FIG. 11 enhanced user interface technology in another implementation 1100. Implementation 1100 involves view 1101 of user interface 1103. View 1101 is representative of a view provided by a display on a computing device, of which computing device 900 in FIG. 9 is representative. User interface 1103 is representative of a user interface that may be rendered on such a display, only a portion of which is visible in view 1101 at any given time. User interface 1103 may be a user interface to a stand-alone application, an operating system, or any other component or collection of components on a computing device.

User interface 1103 includes navigation element 1105, which is representative of a navigational element that binds together two screens in a user interface. Navigation element 1105 binds or visually links screen 1107 and screen 1109.

Data item 1111 (or a graphical representation thereof) is displayed in navigation element 1105 and is representative of a data item that may be loaded through navigation element 1105. When a data item in navigation element 1105 is active, its content may be rendered in one screen while other content associated with it may be rendered in another screen. In this scenario, data item 1111 is a document and document content is rendered in screen 1109. Screen 1107 is representative of a messaging experience in which conversation content may be rendered.

In implementation 1100, user interface 1103 is illustrated in a transition position. That is, user interface 1103 may be shifted left or right by user input, such as a touch gesture, a drag gesture, a mouse click, a mouse drag operation, a voice command, or some other user input. User interface 1103 slides under view 1101, such that some portion of it is visible in view 1101 at any given time.

In one position, all of screen 1107 may be visible, while in another, all of screen 1109 may be visible. In both cases, the other screen is out of view, as is navigation element 1105. However, in two other positions, navigation element 1105 may be visible, while only a portion of one of the screens is visible. A user may navigate from one screen to another, or from one screen to navigation element 1105, by swiping left or right a certain amount or to a particular degree.

Referring back to FIG. 9, computing system 901 is representative of any system or collection of systems in which the various user interfaces, views, software environments, operational scenarios, and processes disclosed herein may be provided. Examples of computing system 901 include, but are not limited to, smart phones, laptop computers, tablet computers, desktop computers, hybrid computers, gaming machines, virtual machines, smart televisions, smart watches and other wearable devices, as well as any variation or combination thereof. In other examples, other types of computers may be involved in the processes, including server computers, rack servers, web servers, cloud computing platforms, and data center equipment, as well as any other type of physical or virtual server machine, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes at least user interface process 906, which is representative of the user interface processes discussed with respect to the preceding FIGS. 1-8, including user interface process 200 and the processes embodied in the operational scenarios and sequences described herein. User interface process 906 may be implemented in the context of an application or group of applications, of which application 703 and operating system 801 are representative.

When executed by processing system 902 to enhance the user experience, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing content and screen linking and other related functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include user interface process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced user interface technology. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It may be understood that computing system 901 is generally intended to represent a computing system or systems on which software 905 may be deployed and executed in order to implement enhanced user interface technology. However, computing system 901 may also be suitable as any computing system on which software 905 may be staged and from where it may be distributed, transported, downloaded, or otherwise provided to yet another computing system for deployment and execution, or yet additional distribution.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface capable of presenting views, user interfaces, and progressions as discussed herein.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Various technical effects may be appreciated from the foregoing implementations. At the user-experience level, content and screen linking as described herein improves the user experience by providing a new way to navigate between applications or application modalities. Rather than "getting lost" in a maze of application screens, the spines disclosed herein anchor a user to the data and applications, thereby reducing the number of jumps, swipes, and other navigational steps needed to transition between tasks.

From other perspectives, a more efficient user experience can lead to battery conservation, improved memory utilization, and other device optimizations. For example, by anchoring a document in a spine and providing a user interface for transitioning between tasks, modalities, or applications while engaged with the document, a user is likely have to repeatedly re-open a document, re-download a document, or take other corrective steps. Such workflow optimizations improve battery consumption and memory utilization.

Certain inventive aspects may be appreciated from the foregoing disclosure, of which the following are various examples.

Example 1

An apparatus comprising: one or more computer readable storage media; and an application stored on the one or more computer readable storage media and comprising program instructions that, when executed by a processing system, direct the processing system to at least: render a user interface to the application comprising a navigation element that visually links at least one screen to one other screen; surface a control in the navigation element with which to load data items; and when a data item loaded in the navigation element is active, present content associated with the data item in the one screen and present other content associated with the data item in the one other screen.

Example 2

The apparatus of Example 1 further comprising the processing system that executes the program instructions, wherein the program instructions further direct the processing system to present only a portion of the user interface in a view area at a given time.

Example 3

The apparatus of Examples 1-2 wherein the navigation element comprises a two-dimensional spine having at least one edge adjacent to the one screen and at least one other edge adjacent to the one other screen.

Example 4

The apparatus of Examples 1-3 wherein the two-dimensional spine includes a control element through which to load the data items.

Example 5

The apparatus of Examples 1-4 wherein the two-dimensional spine includes a data area in which to surface graphical representations of any loaded data items.

Example 6

The apparatus of Examples 1-5 wherein the program instructions further direct the processing system to slide the user interface in a direction perpendicular to an orientation of the two-dimensional spine in order to bring any given portion of the user interface into the view area.

Example 7

The apparatus of Examples 1-6 wherein the orientation comprises a vertical orientation and the direction comprises a horizontal direction.

Example 8

The apparatus of Examples 1-7 wherein the orientation comprises a horizontal orientation and the direction comprises a vertical direction.

Example 9

The apparatus of Examples 1-8 wherein the application includes a word processing component and a messaging component, wherein the content comprises word processing document produced by the word processing component, and wherein the other content comprises messages produced by the messaging component.

Example 10

The apparatus of Examples 1-9 wherein the application includes an image viewing component and a messaging component, wherein the content comprises an image produced by the image viewing component, and wherein the other content comprises messages produced by the messaging component.

Example 11

The apparatus of Examples 1-10 wherein the application includes an image viewing component and a messaging component, wherein the content comprises an image produced by the image viewing component, and wherein the other content comprises messages produced by the messaging component.

Example 12

The apparatus of Examples 1-11 wherein the application comprises a personal information management application that includes a calendar component, wherein the content comprises a calendar produced by the calendar component, and wherein the other content comprises a calendar event produced by the calendar component.

Example 13

The apparatus of Examples 1-12 wherein the application comprises a personal information management application that includes an email component, wherein the content comprises an email produced by the email component, and wherein the other content comprises an inbox produced by the email component.

Example 14

The apparatus of Examples 1-13 wherein the application includes an email component and a word processing component, wherein the content comprises an email viewed with the email component, and wherein the other content comprises a word processing document viewed with the word processing component.

Example 15

The apparatus of Examples 1-14 wherein the data item comprises the email having the word processing document attached thereto.

Example 16

A user interface to a software application stored on one or more computer readable storage media and executable by a processing system, the user interface comprising: one screen in which to present content associated with a data item; one other screen in which to present other content associated with the data item; a two-dimensional spine having at least one edge adjacent to the one screen and at least one other edge adjacent to the one other screen; and a control element included in the two-dimensional spine with which to load data items for display in the one screen and the one other screen.

Example 17

A method of operating a user interface to a software application comprising: rendering a user interface to the software application comprising a navigation element that visually links at least one screen to one other screen; surfacing a control in the navigation element with which to load data items; and when a data item loaded in the navigation element is active, presenting content associated with the data item in the one screen and presenting other content associated with the data item in the one other screen.

Example 18

The method of Example 17 further comprising presenting only a portion of the user interface in a view area at a given time.

Example 19

The method of Examples 17-18 wherein the navigation element comprises a two-dimensional spine having at least one edge adjacent to the one screen and at least one other edge adjacent to the one other screen.

Example 20

The method of Examples 17-19 wherein the method further comprises loading the data items through a control element included in the two-dimensional spine.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. An apparatus comprising:
one or more computer readable storage media; and
an application stored on the one or more computer readable storage media and comprising program instructions that, when executed by a processing system, direct the processing system to at least:
render a user interface to the application comprising a two-dimensional navigation element oriented vertically and having at least one edge bound to one screen in the user interface and at least one other edge bound to one other screen in the user interface, wherein only a portion of the user interface is present in a view area at a given time, wherein sliding the user interface in a horizontal direction brings the one other screen into the view area and moves the one screen out of the view area, and wherein sliding the user interface in an opposite direction relative to the horizontal direction brings the one screen into the view area and moves the one other screen out of the view area;
surface a control in the navigation element with which to load data items; and
when a data item loaded in the navigation element is active, present content associated with the data item in the one screen and present other content associated with the data item in the one other screen.

2. The apparatus of claim 1 wherein, the navigation element remains visible in the view area when the user interface is slid left or right.

3. The apparatus of claim 1 wherein the navigation element is anchored on a right side of the view area when the one screen is in the view area and is anchored on a left side of the view area when the one other screen is in the view area.

4. The apparatus of claim 3 wherein the two-dimensional spine has an oval shape.

5. The apparatus of claim 4 wherein the user interface is navigable by touch input.

6. The apparatus of claim 1 wherein the program instructions further direct the processing system to slide the user interface in a direction perpendicular to an orientation of the two-dimensional spine in order to bring any given portion of the user interface into the view area.

7. The apparatus of claim 6 wherein the orientation comprises a vertical orientation and the direction comprises a horizontal direction.

8. The apparatus of claim 6 wherein the orientation comprises a horizontal orientation and the direction comprises a vertical direction.

9. The apparatus of claim 1 wherein the application includes a word processing component and a messaging component, wherein the content comprises word processing document produced by the word processing component, and wherein the other content comprises messages produced by the messaging component.

10. The apparatus of claim 1 wherein the application includes an image viewing component and a messaging component, wherein the content comprises an image produced by the image viewing component, and wherein the other content comprises messages produced by the messaging component.

11. The apparatus of claim 1 wherein the application includes an image viewing component and a messaging component, wherein the content comprises an image produced by the image viewing component, and wherein the other content comprises messages produced by the messaging component.

12. The apparatus of claim 1 wherein the application comprises a personal information management application that includes a calendar component, wherein the content comprises a calendar produced by the calendar component, and wherein the other content comprises a calendar event produced by the calendar component.

13. The apparatus of claim 1 wherein the application comprises a personal information management application that includes an email component, wherein the content comprises an email produced by the email component, and wherein the other content comprises an inbox produced by the email component.

14. The apparatus of claim 1 wherein the application includes an email component and a word processing component, wherein the content comprises an email viewed with the email component, and wherein the other content comprises a word processing document viewed with the word processing component.

15. The apparatus of claim 14 wherein the data item comprises the email having the word processing document attached thereto.

16. A user interface to a software application stored on one or more computer readable storage media and executable by a processing system, the user interface comprising:
one screen in which to present content associated with a data item;
one other screen in which to present other content associated with the data item;
a two-dimensional spine oriented vertically and having at least one edge bound to the one screen and at least one other edge bound to the one other screen; and
a control element included in the two-dimensional spine with which to load data items for display in the one screen and the one other screen;
wherein only a portion of the user interface is present in a view area at a given time, wherein sliding the user interface in a horizontal direction brings the one other screen into the view area and moves the one screen out of the view area, and wherein sliding the user interface in an opposite direction relative to the horizontal direction brings the one screen into the view area and moves the one other screen out of the view area.

17. A method of operating a user interface to a software application comprising:
rendering the user interface to the software application comprising a two-dimensional navigation element oriented vertically and having at least one edge bound to one screen and at least one other edge bound to one other screen, wherein only a portion of the user interface is present in a view area at a given time, wherein sliding the user interface in a horizontal direction brings the one other screen into the view area and moves the one screen out of the view area, and wherein sliding the user interface in an opposite direction relative to the horizontal direction brings the one screen into the view area and moves the one other screen out of the view area;
surfacing a control in the navigation element with which to load data items; and
when a data item loaded in the navigation element is active, presenting content associated with the data item in the one screen and presenting other content associated with the data item in the one other screen.

18. The method of claim 17 wherein, the navigation element remains visible in the view area when the user interface is slid left or right.

19. The method of claim 17 wherein the navigation element is anchored on a right side of the view area when the one screen is in the view area and is anchored on a left side of the view area when the one other screen is in the view area.

20. The method of claim 17 wherein the method further comprises loading the data items through a control element included in the two-dimensional spine.

* * * * *